(12) United States Patent
Pi et al.

(10) Patent No.: US 12,013,662 B2
(45) Date of Patent: Jun. 18, 2024

(54) APPARATUS FOR ANALYZING DEPTH OF HOLOGRAPHIC IMAGE AND ANALYZING METHOD THEREOF

(71) Applicants: Electronics and Telecommunications Research Institute, Daejeon (KR); MVTECH, Seoul (KR)

(72) Inventors: Jae-Eun Pi, Sejong-si (KR); Yong Hae Kim, Daejeon (KR); Jong-Heon Yang, Daejeon (KR); Chul Woong Joo, Sejong-si (KR); Chi-Sun Hwang, Daejeon (KR); Ha Kyun Lee, Seoul (KR); Seung Youl Kang, Daejeon (KR); Gi Heon Kim, Daejeon (KR); Joo Yeon Kim, Daejeon (KR); Hee-ok Kim, Daejeon (KR); Jeho Na, Daejeon (KR); Jaehyun Moon, Daejeon (KR); Won Jae Lee, Daejeon (KR); Seong-Mok Cho, Daejeon (KR); Ji Hun Choi, Daejeon (KR)

(73) Assignees: Electronics and Telecommunications Research Institute, Daejeon (KR); MVTECH, Seoul (KR)

( * ) Notice: Subject to any disclaimer, the term of this patent is extended or adjusted under 35 U.S.C. 154(b) by 129 days.

(21) Appl. No.: 17/523,197

(22) Filed: Nov. 10, 2021

(65) Prior Publication Data

US 2022/0179359 A1  Jun. 9, 2022

(30) Foreign Application Priority Data

Dec. 8, 2020  (KR) .......................... 10-2020-0170783
Mar. 26, 2021  (KR) .......................... 10-2021-0039486

(51) Int. Cl.
*G03H 1/22* (2006.01)
*G01B 11/02* (2006.01)
*G06T 7/536* (2017.01)

(52) U.S. Cl.
CPC ......... *G03H 1/2249* (2013.01); *G01B 11/026* (2013.01); *G06T 7/536* (2017.01); (Continued)

(58) Field of Classification Search
CPC .. G03H 1/2249; G03H 1/2294; G03H 1/0443; G03H 1/0005; G03H 2001/2281;
(Continued)

(56) References Cited

U.S. PATENT DOCUMENTS 9,197,804 B1 * 11/2015 Or-Bach ............... H04N 23/45
9,500,470 B2   11/2016 Lee et al.
(Continued)

FOREIGN PATENT DOCUMENTS

KR  10-2016-0019306 A  2/2016
KR  10-2016-0019308 A  2/2016
(Continued)

*Primary Examiner* — Stephone B Allen
*Assistant Examiner* — Jyotsna V Dabbi
(74) *Attorney, Agent, or Firm* — NSIP Law

(57) ABSTRACT

An apparatus which analyses a depth of a holographic image is provided. The apparatus includes an acquisition unit that acquires a hologram, a restoration unit that restores a three-dimensional holographic image by irradiating the hologram with a light source, an image sensing unit that senses a depth information image of the restored holographic image, and an analysis display unit that analyzes a depth quality of the holographic image, based on the sensed depth information image, and the image sensing unit uses a lensless type of photosensor.

6 Claims, 7 Drawing Sheets

(52) U.S. Cl.
CPC . *G03H 2001/2281* (2013.01); *G03H 2210/30* (2013.01); *G03H 2222/12* (2013.01); *G03H 2223/19* (2013.01); *G06T 2207/10028* (2013.01)

(58) Field of Classification Search
CPC ... G03H 2001/2247; G03H 2001/2244; G03H 2001/0038; G03H 2210/30; G03H 2210/42; G03H 2210/454; G03H 2210/55; G03H 2226/11; G03H 2222/12; G06T 7/536; G06T 2207/10028; G01B 11/026; G01B 9/02041; G01B 9/02047; H04N 23/00; H04N 23/45; H04N 23/54; H04N 23/55; H04N 13/243; H04N 25/48; H04N 25/71; H04N 25/79; H04N 2209/048; H04N 2209/049; H04N 2209/042

USPC .............................................. 359/23; 356/457
See application file for complete search history.

(56) References Cited

U.S. PATENT DOCUMENTS

| | | | | |
|---|---|---|---|---|
| 2016/0040983 | A1* | 2/2016 | Lee | G01B 11/026 |
| | | | | 356/601 |
| 2018/0341222 | A1* | 11/2018 | Nam | G03H 1/2202 |
| 2019/0332055 | A1 | 10/2019 | Yoon | |
| 2020/0184664 | A1 | 6/2020 | Rhee et al. | |

FOREIGN PATENT DOCUMENTS

| | | |
|---|---|---|
| KR | 10-2018-0048082 A | 5/2018 |
| KR | 10-2020-0069096 A | 6/2020 |

\* cited by examiner

FIG. 11
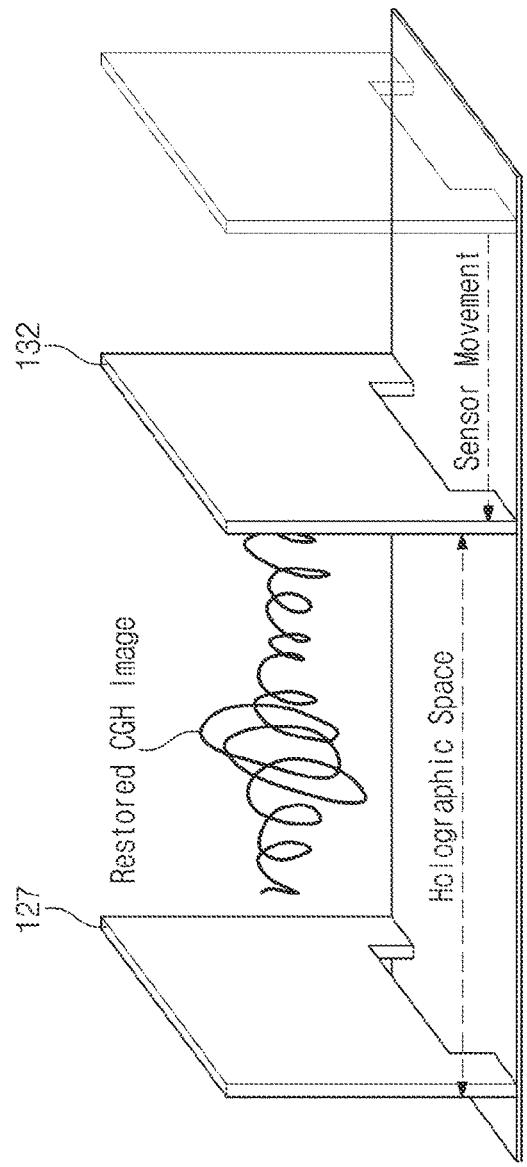
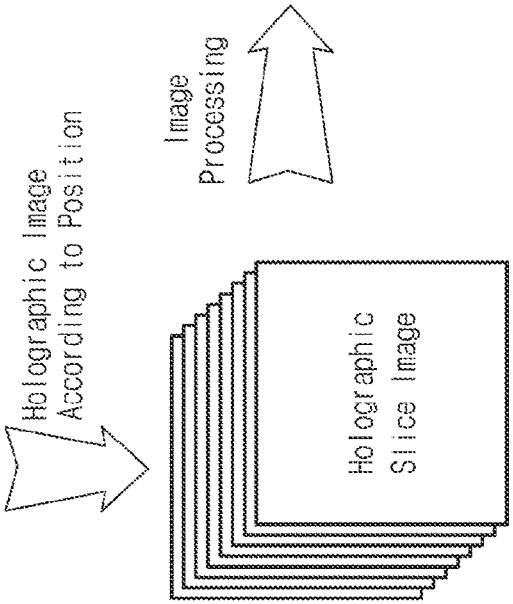
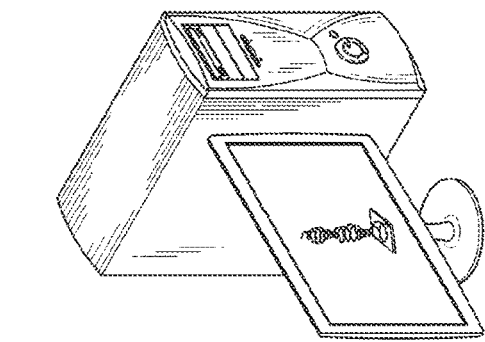
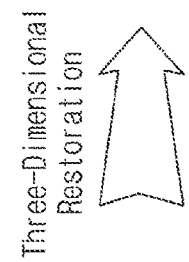
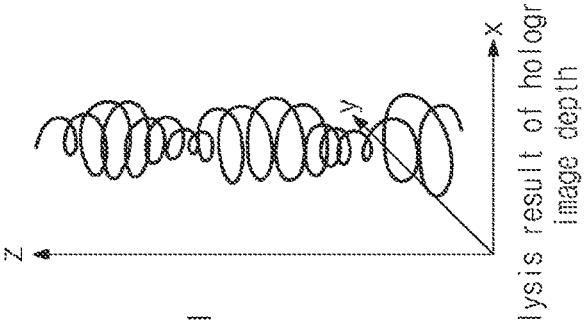

APPARATUS FOR ANALYZING DEPTH OF HOLOGRAPHIC IMAGE AND ANALYZING METHOD THEREOF

CROSS-REFERENCE TO RELATED APPLICATIONS

This application claims priority under 35 U.S.C. § 119 to Korean Patent Application Nos. 10-2020-0170783, filed on Dec. 8, 2020, and 10-2021-0039486, filed on Mar. 26, 2021, respectively, in the Korean Intellectual Property Office, the disclosures of which are incorporated by reference herein in their entireties.

BACKGROUND

Embodiments of the present disclosure described herein relate to analysis of a holographic image, and more particularly, relate to an apparatus for analyzing a depth of a holographic image, and a method for analyzing a depth of a holographic image.

A holographic display technology is a technology that reproduces the wavefront caused by an object by using a diffraction and interference principle of light, and makes the object appear as if it actually exists to observer's eyes. In particular, unlike the conventional stereo-type pseudo-hologram, the holographic display technology does not have accommodation-convergence mismatch, so there is no dizziness or discomfort caused by moving a viewpoint, thus it may be considered as the ultimate hologram reproduction technology.

In the current industry, for the realization of an ideal holographic display, the focus is on the development of display devices, the production of holographic contents, and the fast processing speed. However, there is still a long way to go in research for quality analysis of holographic images for final commercialization.

To measure a depth of the previously developed holographic image, a method of acquiring a three-dimensional image with a lens array and an image sensor is used. Since this method uses a lens optical system, there is a physical limitation when measuring a very deep depth, and it is difficult to freely change the focal length. Accordingly, the present disclosure intends to present an apparatus for analyzing a depth of a 3D digital hologram image capable of easily changing the focal length.

SUMMARY

Embodiments of the present disclosure provide an apparatus for measuring a depth of a restored 3D holographic image for quality analysis of a holographic display in which a focal length can be freely changed.

According to an embodiment of the present disclosure, an apparatus of analyzing a depth of a holographic image includes an acquisition unit that acquires a hologram, a restoration unit that restores a three-dimensional holographic image by irradiating the hologram with a light source, an image sensing unit that senses a depth information image of the restored holographic image, and an analysis display unit that analyzes a depth quality of the holographic image, based on the sensed depth information image, and the image sensing unit uses a lensless type of photosensor.

According to an embodiment, the image sensing unit may include a photosensor panel that measures the holographic image restored by the restoration unit, and an electric rail that moves the photosensor panel in a depth direction of the holographic image.

According to an embodiment, the depth direction of the holographic image may correspond to a direction of a spatial light modulator of the restoration unit from the photosensor panel.

According to an embodiment, the image sensing unit may include a plurality of transparent plane photosensors that measures the holographic image restored by the restoration unit, and at least one electric rail that moves the plurality of transparent plane photosensors in a depth direction of the holographic image.

According to an embodiment, the plurality of transparent plane photosensor may include a first transparent plane photosensor that moves in a depth direction of a first region of a holographic space in which the restored holographic image is displayed, and a second transparent plane photosensor that moves in a depth direction of a second region of the holographic space.

According to an embodiment, the first region and the second region may not overlap each other.

According to an embodiment, the apparatus may further include an image transmission unit that sequentially transmits the depth information image sensed by the image sensing unit in real time, and an image generating unit that three-dimensionally restores the transmitted depth information image in a depth axis direction.

According to an embodiment, the analysis display unit may compare the depth information image with depth information of an original image associated with an object, and may analyze a depth reproduction quality based on the comparison result.

According to an embodiment, the restoration unit may include a laser unit that generates a laser and provides the generated laser as the light source, a collimator that outputs the generated laser as an enlarged plane wave, a spatial light modulator that reflects light modulated by the plane wave into a space when the enlarged plane wave is incident, and a beam splitter that changes and propagates at least a portion of the light reflected from the spatial light modulator in a set direction.

According to an embodiment of the present disclosure, a method of analyzing a depth of a holographic image includes acquiring a hologram using RGB brightness information and 3D stereoscopic information on an object, restoring a three-dimensional holographic image by irradiating the hologram with a light source, sensing a depth information image for each position in a holographic space in which the restored holographic image is displayed, restoring a three-dimensional image including a depth axis direction in real time using the sensed depth information image for each position, and comparing the restored 3D image including the depth axis direction with a depth of an original image corresponding to the object, and analyzing a depth quality based on the comparison result.

According to an embodiment, the sensing of the depth information image for each position may be performed by using a photosensor panel that measures the restored holographic image while moving in the depth axis direction in the holographic space.

According to an embodiment, the sensing of the depth information image for each position may be performed by using a plurality of transparent plane photosensors that measure the restored holographic image while moving in the depth axis direction in the holographic space.

According to an embodiment, each of the plurality of transparent plane photosensors may move in the depth axis direction within a designated region.

BRIEF DESCRIPTION OF THE FIGURES

The above and other objects and features of the present disclosure will become apparent by describing in detail embodiments thereof with reference to the accompanying drawings.

FIG. 11 is a diagram schematically illustrating a method for analyzing a depth of a holographic image according to the present disclosure.

DETAILED DESCRIPTION

Figure 1:
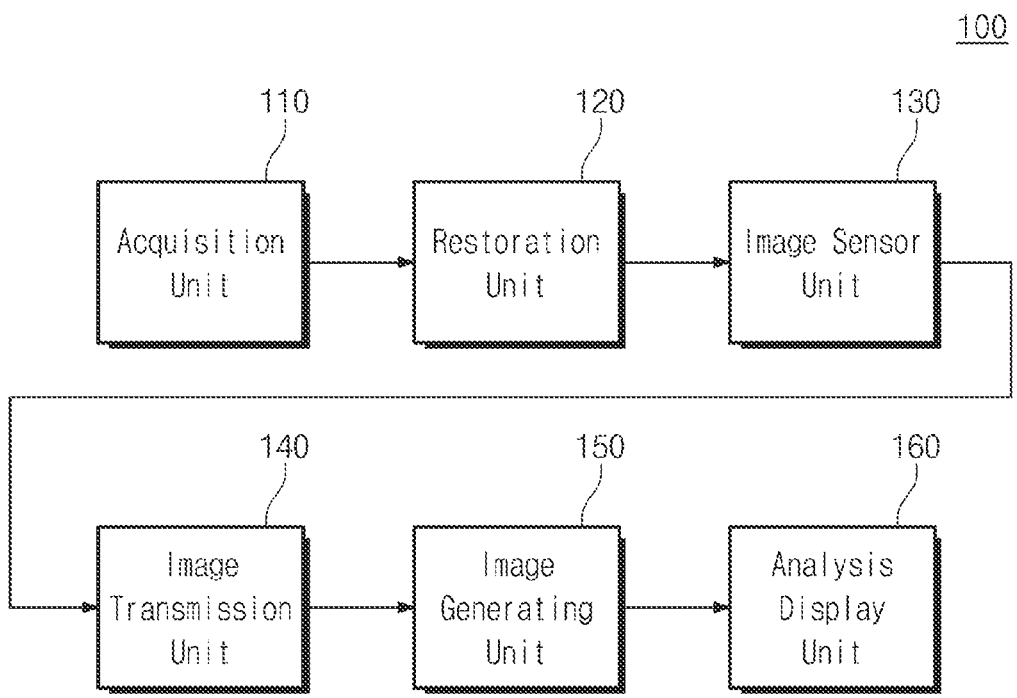
FIG. 1 is a block diagram schematically illustrating an apparatus for analyzing a depth of a holographic image according to an embodiment of the present disclosure.

It is to be understood that both the foregoing general description and the following detailed description are examples, and it is intended that an additional description of the claimed disclosure is provided. Reference numerals are indicated in detail in preferred embodiments of the present disclosure, examples of which are indicated in the reference drawings. Wherever possible, the same reference numerals are used in the description and drawings to refer to the same or like parts. Hereinafter, embodiments of the present disclosure will be described with reference to the accompanying drawings such that those skilled in the art may easily carry out the present disclosure.

FIG. 1 is a block diagram schematically illustrating an apparatus for analyzing a depth of a holographic image according to an embodiment of the present disclosure. Referring to FIG. 1, a holographic image depth analysis apparatus 100 according to an embodiment of the present disclosure includes an acquisition unit 110, a restoration unit 120, an image sensor unit 130, an image transmission unit 140, an image generating unit 150, and an analysis display unit 160.

Figure 2:
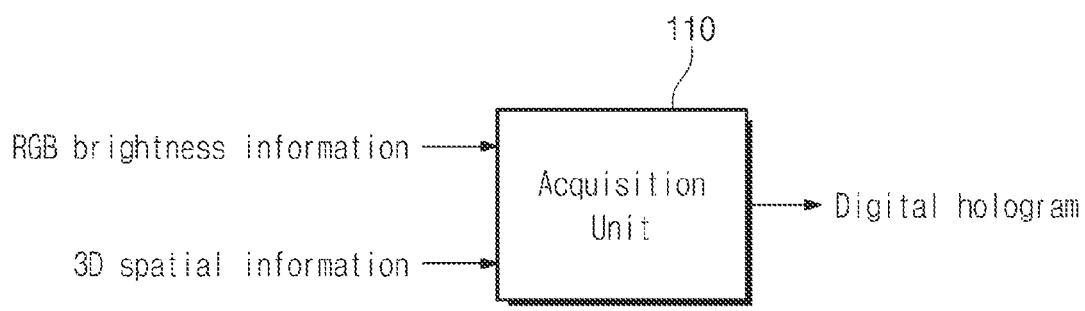
FIG. 2 is a block diagram schematically illustrating an input/output relationship of an acquisition unit of FIG. 1.

The acquisition unit 110 may acquire a hologram through computer calculation or directly through an optical method. In this case, the acquisition unit 110 may receive RGB (Red, Green, and Blue) brightness information and 3D stereoscopic information on an object (a subject), and may acquire the hologram through computer calculation based on input information, or may directly acquire the hologram through the optical method. For example, as illustrated in FIG. 2 to be described later, as the input information, the acquisition unit 110 may receive the RGB brightness information of a three-dimensional object and various types of three-dimensional information such as a depth map, point cloud data, or a three-dimensional mesh model-based data. The acquisition unit 110 may generate a digital hologram by performing a computer calculation using the input stereoscopic information.

The restoration unit 120 irradiates the acquired hologram with a light source such as laser, an LED (Light Emitting Diode), or white light to optically restore a three-dimensional holographic image (i.e., a reproduction image of the hologram). For optical restoration of the digital hologram, the restoration unit 120 may include, for example, a light source unit generating the light source such as the laser or the LED, a spatial light modulator (SLM), and an optical system such as a lens and a mirror.

The image sensor unit 130 includes a photosensor panel that measures the restored hologram region in a space and an electric rail that precisely moves the photosensor panel in the space. The photosensor panel is a near-focus sensor display of a lensless type, and its array may be composed of elements that record information of a light source incident from the outside. The recording elements are required to have a high pixel density (PPI: Pixel Per Inch) and a large area so as to acquire images with high precision and a wider range. To implement this, the photosensor panel may be configured with a large-area high-resolution sensor image array formed on a glass substrate. The photosensor panel may be provided in a lensless type so that only holographic information close to the sensor may be recognized. By moving the photosensor panel directly in a direction of the light modulator as much as a sensor movement distance (a depth of a hologram region), the depth information image for each position may be sensed. In addition, in another embodiment, the image sensor unit 130 may arrange a plurality of transparent photosensor panels in a holographic space. In this embodiment, since several photosensor panels are used at once, the time required for moving the sensor may be shortened.

The image transmission unit 140 sequentially transmits the holographic spatial images obtained by the image sensor unit 130 to the image generating unit 150. The image transmission unit 140 transfers the obtained holographic spatial images from an output port of the image sensor unit 140 to an input port of the image generating unit 150 in real time. In this case, the input port enables transmission of information by using a wired/wireless protocol port embedded in a mobile phone, a tablet, or a laptop computer in addition to a PC.

The image generating unit 150 restores the holographic spatial images transmitted in real time in three dimensions in a depth axis direction. The image generating unit 150 may provide the restored holographic spatial images to the analysis display unit 160.

The analysis display unit 160 may analyze a depth reproduction quality of the holographic image, based on the measured depth of the holographic image. In this case, the analysis display unit 160 may compare the measured depth of the holographic image with a depth of an original image associated with the object, and may analyze the depth reproduction quality based on the comparison result. The analysis display unit 160 may obtain a relationship between an original depth and the measurement depth, and may analyze results such as linear/nonlinear characteristics in the depth axis direction, a depth reproduction accuracy of the restored image depending on a position in a horizontal-vertical axis direction, the depth reproduction accuracy depending on an observation angle, a depth resolution for each depth. In addition, from the result, it is possible to evaluate hologram signal processing algorithm such as hologram generation and compression/encoding, an optical acquisition environment of a hologram, and a holographic display system. The analysis display unit 160 analyzes factors that cause quality deterioration based on the evaluation result, so that it can be effectively utilized for quality improvement. The analysis display unit 160 may display the analysis result on a display.

The holographic image depth analysis apparatus 100 according to an embodiment of the present disclosure described above may measure the depth of a 3D stereoscopic reproduced image restored optically from the hologram. In addition, by comparing the measured depth information of the 3D stereoscopic image with the depth information of the 3D original object, it is possible to objectively evaluate the depth reproduction quality of the hologram. In particular, since the image sensor unit 130 may measure the depth of the 3D holographic image in a lensless type, there is little physical limitation and a focal length may be freely changed.

FIG. 2 is a block diagram schematically illustrating an input/output relationship of an acquisition unit of FIG. 1. Referring to FIG. 2, the acquisition unit 110 may receive RGB brightness information and 3D spatial information of a 3D object, and may calculate a digital hologram that is fringe pattern data using a computer-generated hologram (CGH) method. In this case, the 3D spatial information may be a depth map, point cloud data, or 3D mesh model data.

Figure 3:
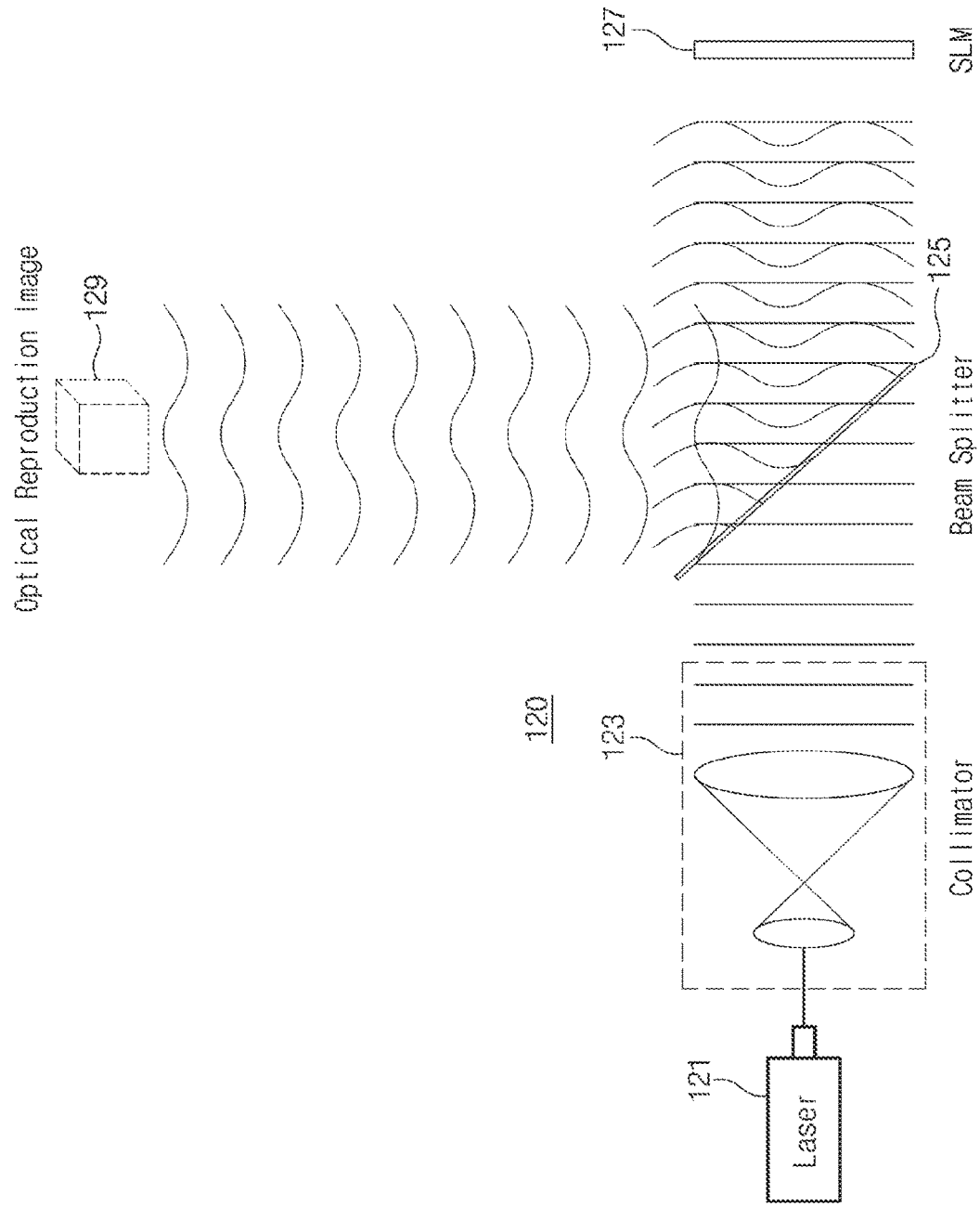
FIG. 3 is a diagram illustrating a restoration unit of FIG. 1 by way of example.

FIG. 3 is a diagram illustrating a restoration unit of FIG. 1 by way of example. Referring to FIG. 3, the restoration unit 120 in an apparatus for measuring a quality of the holographic image is an apparatus capable of optically restoring the hologram, and may include a laser 121, a collimator 123, a beam splitter 125, and a spatial light modulator 127 (SLM).

The laser 121 may generate a laser and may irradiate the hologram. In this case, the hologram may exist at a position of the spatial light modulator SLM.

The collimator 123 may output the generated laser as an enlarged plane wave.

The spatial light modulator 127 may be a display that reproduces the hologram, and when a plane wave output from the collimator 123 passes through the beam splitter 125 and is incident, may reflect light modulated from the incident plane wave into the space.

The beam splitter 125 may transmit the output plane wave and may transfer it to the spatial light modulator 127. In addition, the beam splitter 125 may separate at least a portion of the light reflected from the spatial light modulator 127 by changing the direction to form an image at a desired position, thereby restoring the holographic image 129.

Figure 4:
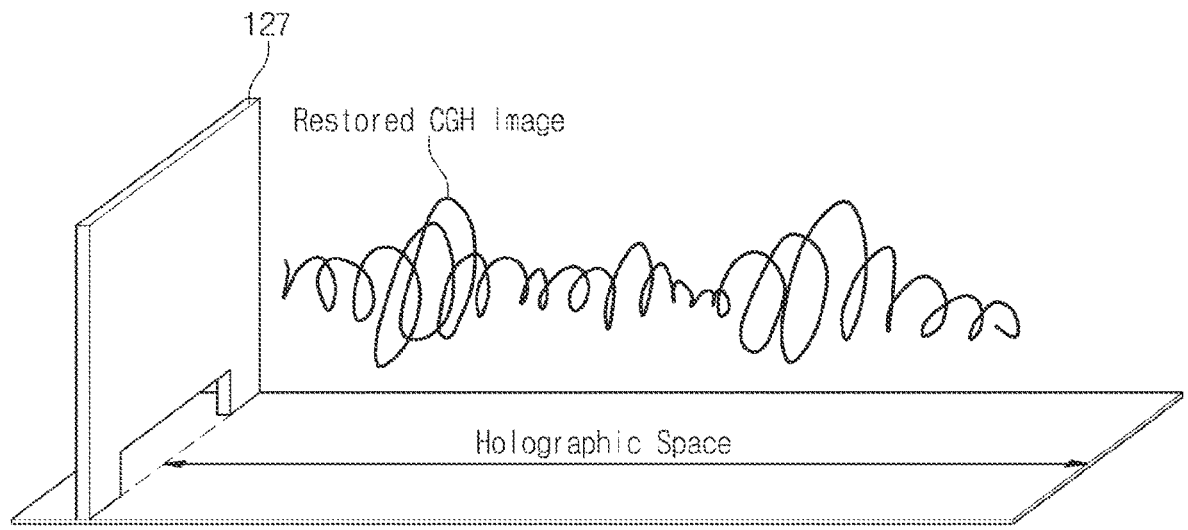
FIG. 4 is a diagram illustrating a 3D hologram image restored through a spatial light modulator.

FIG. 4 is a diagram illustrating a 3D hologram image restored through a spatial light modulator. Referring to FIG. 4, a computer generated hologram (hereinafter, CGH) restored by the spatial light modulator 127 may be displayed in the holographic space.

A three-dimensional CGH image with a sense of depth restored by the spatial light modulator 127 is positioned between an observer and an SLM panel constituting the spatial light modulator 127. The observer may see this image from a front of the panel and may feel the spatial sense of the front and back images as the viewpoint moves. The 3D image may be differentially expressed depending on the panel performance of the spatial light modulator 127 and a configuration of an optical device.

Figure 5:
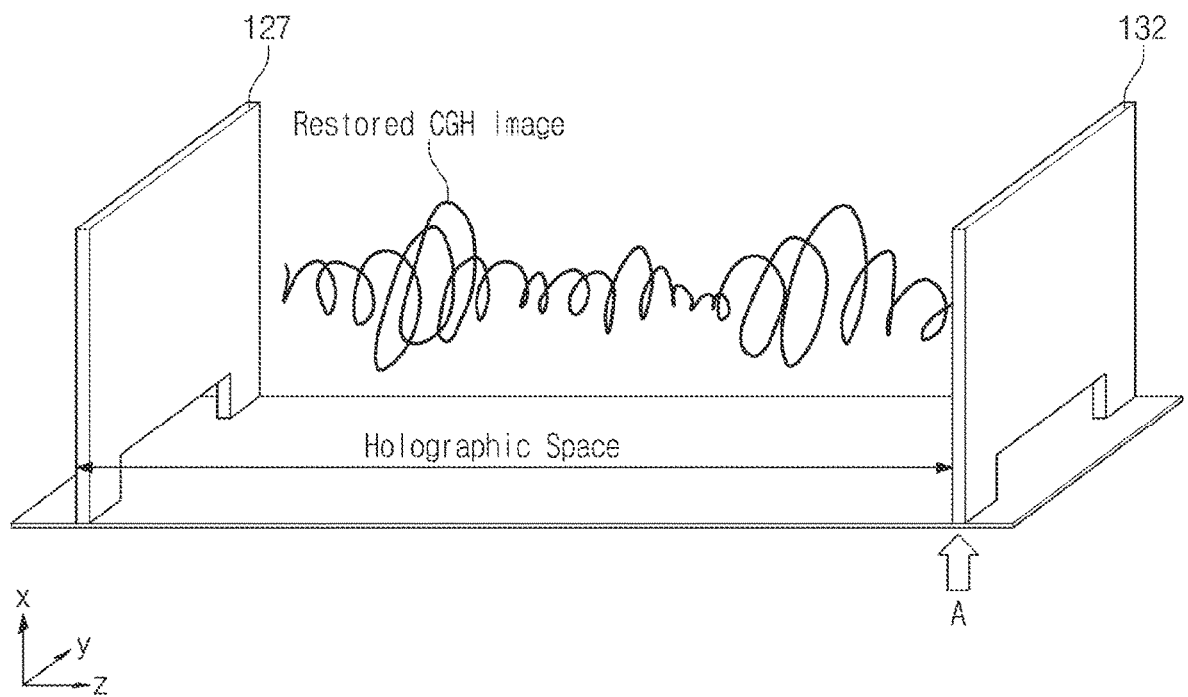
FIG. 5 is a diagram illustrating an image sensor unit of the present disclosure.

FIG. 5 is a diagram illustrating an image sensor unit of the present disclosure. Referring to FIG. 5, the image sensor unit 130 (refer to FIG. 1) includes a photosensor panel 132 that measures a holographic image expressed in the holographic space, and an electric rail (not illustrated) that precisely moves the photosensor panel 132.

The three-dimensional CGH image restored by the spatial light modulator 127 is displayed on the holographic space. In addition, the photosensor panel 132 may move to measure a hologram region expressed on the holographic space. For this purpose, an electric rail that precisely moves the photosensor panel 132 will be driven.

The photosensor panel 132 is the near-focus sensor display of the lensless type, and may be composed of an array of elements that record information of the light source incident from the outside. These recording elements are required to have a high pixel density (PPI: Pixel Per Inch) and a large area so as to acquire images with high precision and a wider range. Accordingly, to satisfy this condition, the photosensor panel 132 may be configured with a large-area high-resolution sensor image array formed on a glass substrate. The photosensor panel 132 is configured in a lensless manner so that only holographic information close to the sensor may be recognized. In particular, the photosensor panel 132 may sense the depth information image at each of a plurality of positions while the photosensor panel 132 directly moves in a direction (z-axis direction) of the spatial light modulator 127 as much as the sensor movement distance (the depth of the hologram region).

Figure 6:
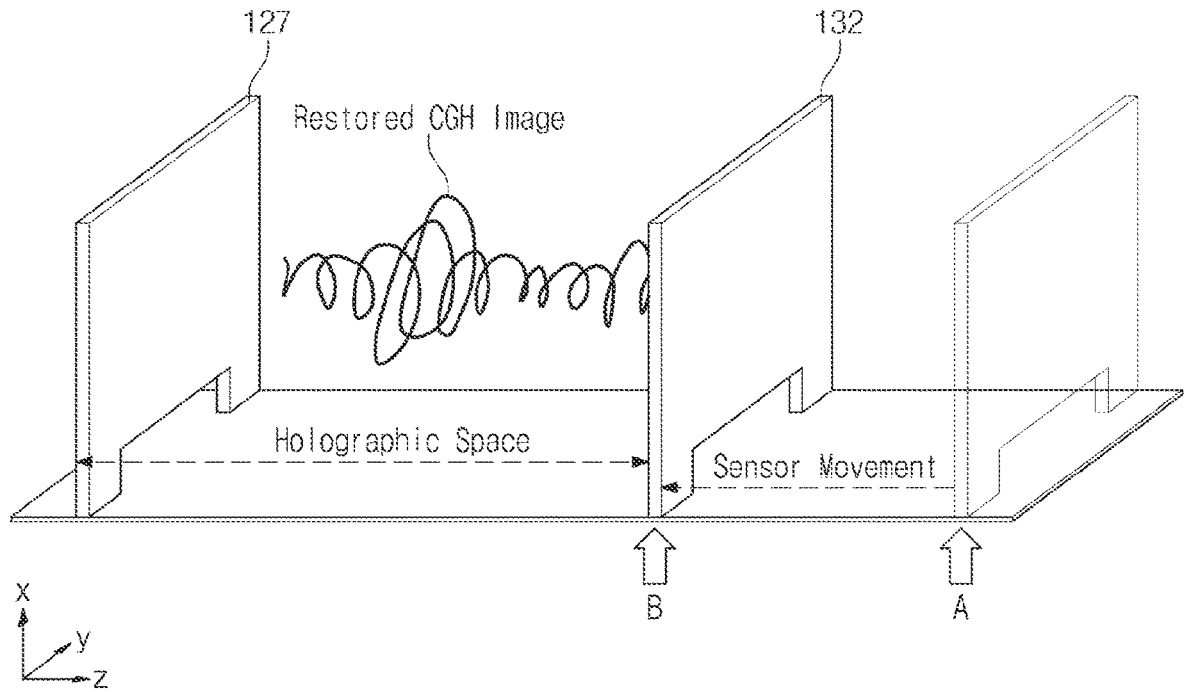
FIG. 6 is a diagram illustrating a sensing operation at a specific position of a photosensor panel in an image sensor unit of the present disclosure.

FIG. 6 is a diagram illustrating a sensing operation at a specific position of a photosensor panel in an image sensor unit of the present disclosure. Referring to FIG. 6, the image sensor unit 130 (refer to FIG. 1) may precisely move the photosensor panel 132 from an initial position 'A' to a next sensing position 'B' in the holographic space using the electric rail.

The photosensor panel 132 moves from the initial position 'A' in the direction (z-axis direction) of the spatial light modulator 127. In particular, the photosensor panel 132 maintains the same position as in the position 'A' with respect to the 'x' and 'y' axes at the position 'B'. The photosensor panel 132 will sense the depth information image of the CGH image restored from the moved position 'B'.

Figure 7:
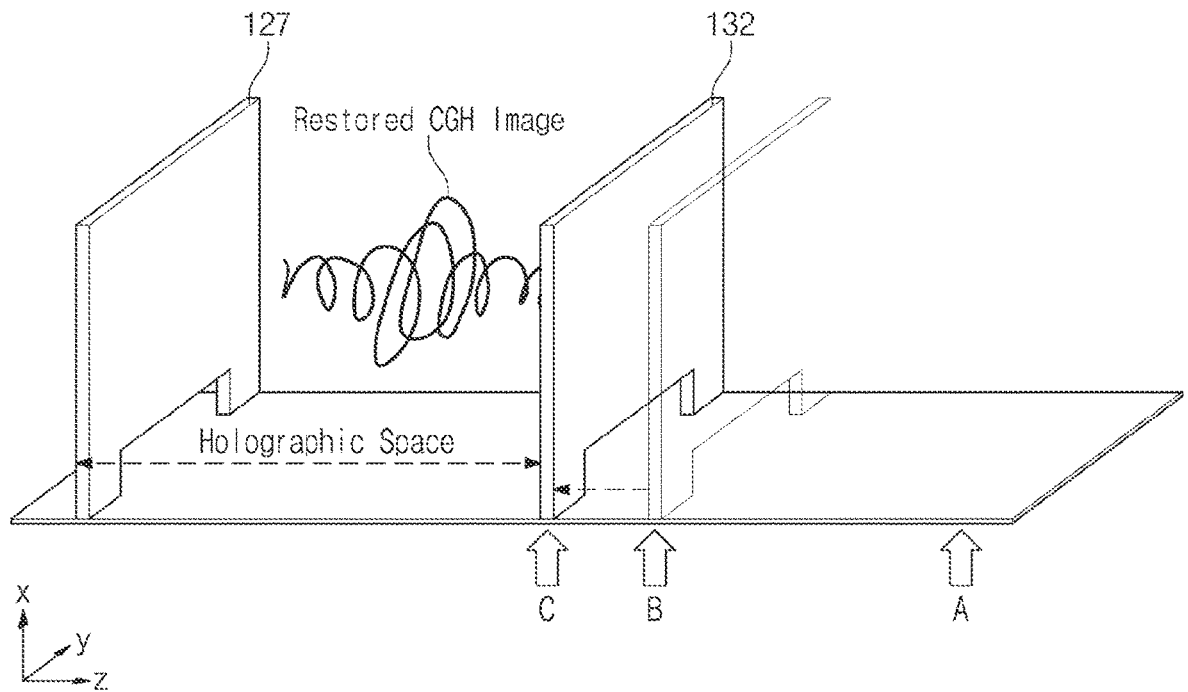
FIG. 7 is a diagram illustrating a sensing operation at a specific position of a photosensor panel in an image sensor unit of the present disclosure.

FIG. 7 is a diagram illustrating a sensing operation at a specific position of a photosensor panel in an image sensor unit of the present disclosure. Referring to FIG. 7, the image sensor unit 130 (refer to FIG. 1) may precisely move the photosensor panel 132 from the position 'B' to a next sensing position 'C' in the holographic space using the electric rail.

The photosensor panel 132 moves in the direction (z-axis direction) of the spatial light modulator 127 from the previous sensing position 'B'. In particular, the photosensor panel 132 maintains the same position as at the position 'B' with respect to the 'x' and 'y' axes at the position 'C'. The photosensor panel 132 will sense the depth information image of the CGH image restored from the moved position 'C'.

Figure 8:
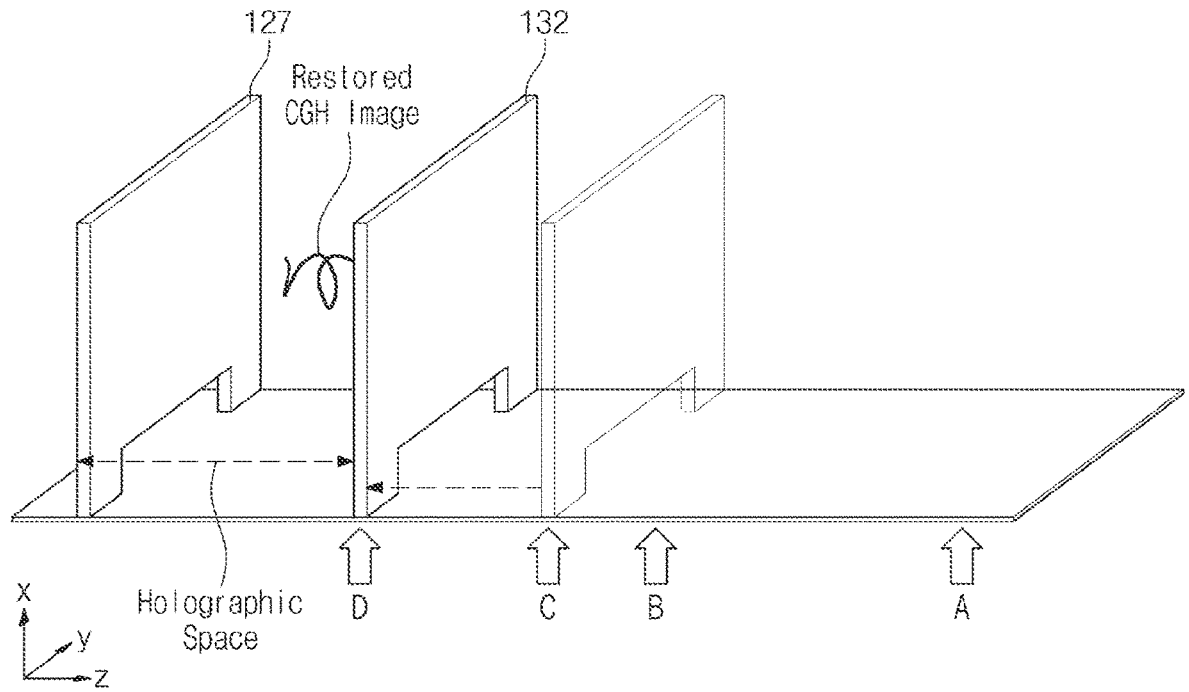
FIG. 8 is a diagram illustrating a sensing operation at a specific position of a photosensor panel in an image sensor unit of the present disclosure.

FIG. 8 is a diagram illustrating a sensing operation at a specific position of a photosensor panel in an image sensor unit of the present disclosure. Referring to FIG. 8, the image sensor unit 130 (refer to FIG. 1) may precisely move the photosensor panel 132 from the position 'C' to a next sensing position 'D' in the holographic space using the electric rail.

The photosensor panel 132 moves in the direction (z-axis direction) of the spatial light modulator 127 from the previous sensing position 'C'. In particular, the photosensor panel 132 maintains the same position as at the position 'C' with respect to the 'x' and 'y' axes at the position 'D'. The photosensor panel 132 will sense the depth information image of the CGH image restored from the moved position 'D'.

With reference to FIGS. 5 to 8, the movement of the photosensor panel 132 constituting the image sensing unit 130 of the present disclosure and the sensing method of the depth information image at each of the plurality of moved positions have been described. The image sensing unit 130 will sequentially transmit the holographic spatial images sensed at each position to the image generating unit 150 through the image transmission unit 140. The image transmission unit 140 may transmit the holographic spatial images sensed for each position in real time.

Figure 9:
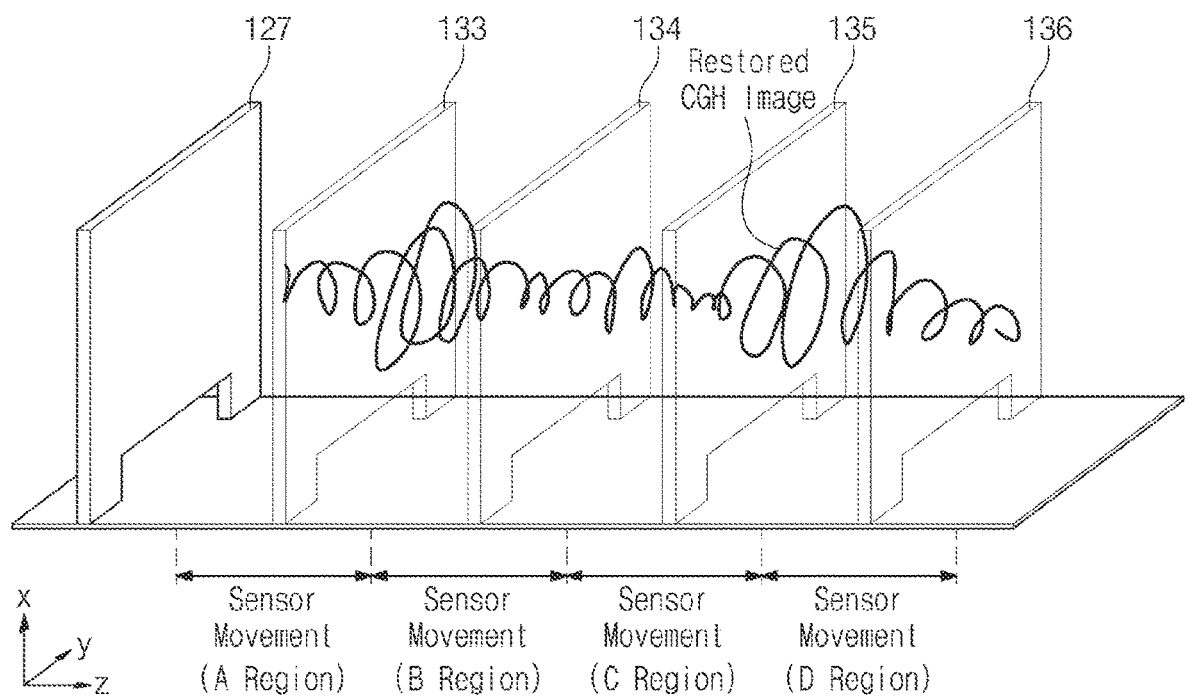
FIG. 9 is a diagram illustrating an image sensor unit according to another embodiment of the present disclosure.

FIG. 9 is a diagram illustrating an image sensor unit according to another embodiment of the present disclosure. Referring to FIG. 9, the image sensor unit 130 (refer to FIG. 1) may include a plurality of transparent plane photosensors 133, 134, 135, and 136 that measure the holographic image expressed in the holographic space, and may include at least one electric rail (not illustrated) that precisely moves each of the plurality of transparent plane photosensors 133, 134, 135, and 136.

The three-dimensional CGH image restored by the spatial light modulator 127 is displayed on the holographic space. In addition, the plurality of transparent plane photosensors 133, 134, 135, and 136 may move to measure the hologram region expressed in the holographic space. To this end, the electric rail or actuators for precisely moving the plurality of transparent plane photosensors 133, 134, 135, and 136 may be further included. Each of the plurality of transparent plane photosensors 133, 134, 135, and 136 may be provided with a transparent photosensor panel formed of a transparent material. Accordingly, the 3D CGH image restored from the spatial light modulator 127 may be displayed on the entire holographic space by passing through the transparent plane photosensors 133, 134, 135, and 136.

The transparent plane photosensor 133 may move within an 'A' region by the sensor movement distance allocated in the direction (z-axis direction) of the spatial light modulator 127. The depth information image in the region 'A' may be sensed by the transparent plane photosensor 133. In this case, the distance that the transparent plane photosensor 133 moves is significantly reduced compared to the distance that one photosensor panel 132 (refer to FIG. 5) moves, and the moving time is also reduced depending on the reduction of the moving distance of the sensor.

As in the above description, the transparent plane photosensor 134 is in charge of sensing the depth information image in a 'B' region. Since the transparent plane photosensor 134 only needs to move within the 'B' region, the moving time may be significantly reduced. The transparent plane photosensor 135 is in charge of sensing the depth information image in a 'C' region. In addition, the transparent plane photosensor 136 is in charge of sensing the depth information image in a 'D' region. Since the transparent plane photosensors 135 and 136 also only need to move within the 'C' region and the 'D' region, respectively, the movement time of the sensor may be remarkably reduced. Compared to the case of measuring with only one photosensor panel, it takes only the time divided by the number of transparent plane photosensors to move the sensor, so quick depth analysis will be possible. Therefore, it is expected as a technology that will contribute to an industrialization of the light modulator display.

In this case, an example in which the four transparent plane photosensors 133, 134, 135, and 136 are dedicated to four regions in the holographic space to sense the depth information image has been described, but the present disclosure is not limited thereto. The number of transparent plane photosensors to be disposed may be determined in consideration of the length of the holographic space or characteristics or performance of the electric rail for driving the transparent plane photosensors.

Figure 10:
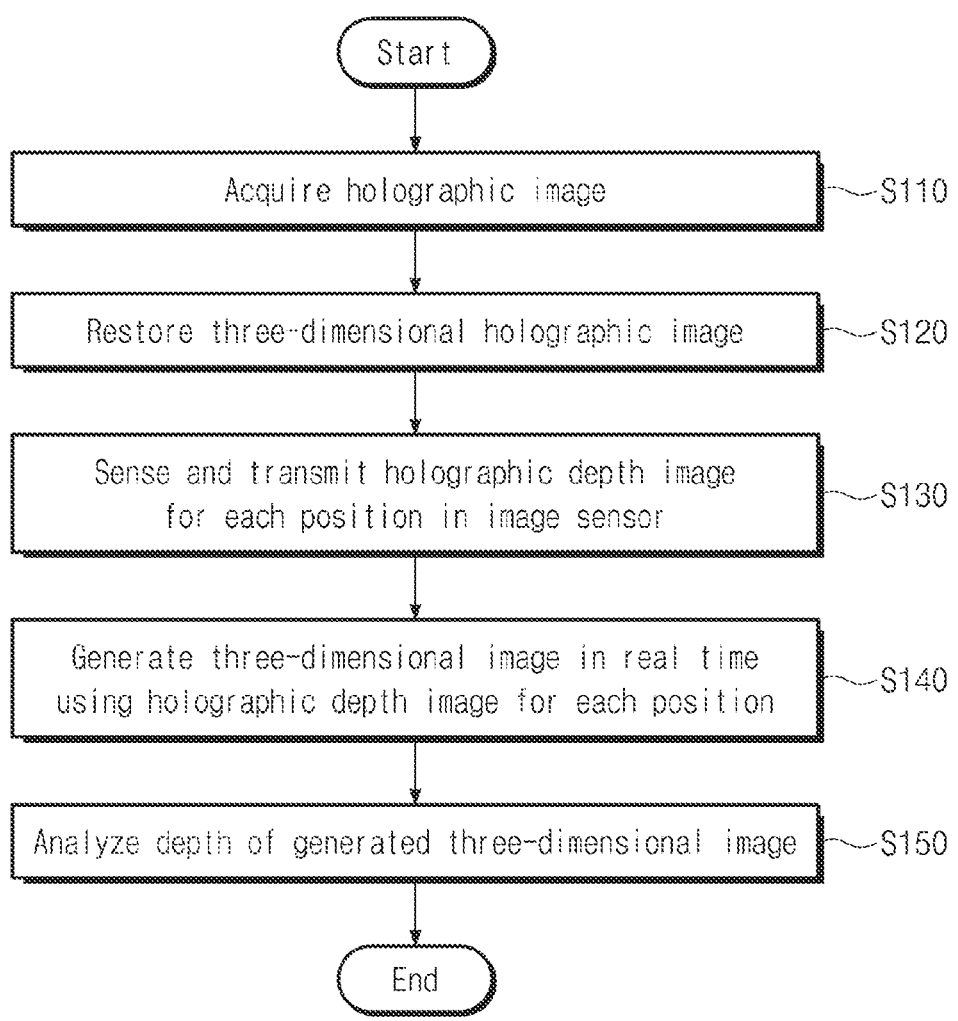
FIG. 10 is a flowchart schematically illustrating a method for analyzing a depth of a holographic image according to an embodiment of the present disclosure.

FIG. 10 is a flowchart schematically illustrating a method for analyzing a depth of a holographic image according to an embodiment of the present disclosure. Referring to FIG. 10, a method for analyzing a depth of a holographic image using an image sensor unit using a position-movable photosensor panel or a transparent plane photosensor according to the present disclosure will be described.

In operation S110, a holographic image is obtained by the holographic image depth analysis apparatus 100. First, the acquisition unit 110 (refer to FIG. 1) may acquire a hologram. In this case, the holographic image depth analysis apparatus 100 may receive the RGB brightness information and the 3D stereoscopic information on an object, and may acquire the holographic image using the input RGB brightness information and the input 3D stereoscopic information. In addition, the holographic image depth analysis apparatus 100 may divide the beam into equal parts through the beam splitter, may transfer it to each of the object and the mirror, and may acquire the hologram corresponding to an interference pattern of the beam reflected from the object with respect to the beam reflected from the mirror through the camera.

In operation S120, the holographic image depth analysis apparatus 100 may restore the three-dimensional holographic image by irradiating a light source to the hologram. In this case, the holographic image depth analysis apparatus 100 may generate a laser as the light source through the laser unit, and output the generated laser as the enlarged plane wave through the collimator. In addition, the holographic image depth analysis apparatus 100 may modulate the plane wave when the enlarged plane wave is incident through the spatial light modulator SLM, may reflect it into the space, and may restore the holographic image by changing a direction of at least some of the modulated plane waves reflected from the spatial light modulator SLM through the beam splitter and by propagating it into an empty space.

In operation S130, the holographic image depth analysis apparatus 100 will sense the depth information image of the holographic image restored for each position in the holographic space. In this case, the image sensor unit 130 (refer to FIG. 1) may precisely move the photosensor panel 132 in the holographic space by using the electric rail. In addition, the sensed holographic depth information image for each position will be transmitted to the image generating unit 150 in real time by the image transmission unit 140.

In operation S140, the holographic image depth analysis apparatus 100 generates the three-dimensional image in real time by using the holographic depth information image for each position in the holographic space. The image generating unit 150 (refer to FIG. 1) restores the holographic spatial images transmitted in real time in the depth axis direction in three dimensions. The image generating unit 150 may provide the restored holographic spatial images to the analysis display unit 160.

In operation S150, the analysis display unit 160 may analyze the depth quality of the holographic image, based on the measured depth of the holographic image. In this case, the analysis display unit 160 may compare the measured depth of the holographic image with the depth of the original image associated with the object, and may analyze the depth quality based on the comparison result. The analysis display unit 160 may obtain a relationship between the original depth and the measurement depth, and may analyze results such as linear/nonlinear characteristics in the depth axis (z-axis) direction, a depth reproduction accuracy of the restored image depending on a position in a horizontal-vertical axis direction, the depth reproduction accuracy depending on an observation angle, a depth resolution for each depth. In addition, from the result, it is possible to evaluate hologram signal processing algorithm such as hologram generation and compression/encoding, an optical acquisition environment of the hologram, and a holographic display system. The analysis display unit 160 analyzes factors that cause quality deterioration based on the evaluation result, so that it can be effectively utilized for quality improvement. The analysis display unit 160 may display the analysis result on the display.

FIG. 11 is a diagram schematically illustrating a method for analyzing a depth of a holographic image according to the present disclosure. Referring to FIG. 11, the image for depth analysis may be sensed and transmitted in real time by the image sensor unit using the movable photosensor panel 132 or the transparent plane photosensor 133, 134, 135, and 136 of the present disclosure.

The holographic image depth analysis apparatus 100 (refer to FIG. 1) will sense the depth information image of the holographic image restored for each position in the holographic space. In this case, the image sensor unit 130 (refer to FIG. 1) may precisely move the photosensor panel 132 or the transparent plane photosensors 133, 134, 135, and 136 in the holographic space by using the electric rail. In addition, the sensed holographic depth information image for each position (the position 'A' to a position 'N') will be transmitted to the image generating unit 150 in real time by the image transmission unit 140.

A real-time three-dimensional image generating apparatus illustrated as an example of the image generating unit 150 generates the three-dimensional image in real time by using the holographic depth information image for each position in the holographic space. The real-time 3D image generating apparatus restores the holographic spatial images transmitted in real time in the direction of the depth axis in three dimensions. The image generating unit 150 may provide the restored holographic spatial images to the analysis display unit 160.

The analysis display unit 160 may analyze the depth quality of the holographic image based on the measured depth of the holographic image. In this case, the analysis display unit 160 may compare the measured depth of the holographic image with the depth of the original image associated with the object, and may analyze the quality of the sense of depth based on the comparison result. The analysis display unit 160 may obtain a relationship between the original depth and the measurement depth, and may analyze results such as linear/nonlinear characteristics in the depth axis (z-axis) direction, a depth reproduction accuracy of the restored image depending on a position in a horizontal-vertical axis direction, the depth reproduction accuracy depending on an observation angle, a depth resolution for each depth. In addition, from the result, the hologram signal processing algorithm such as hologram generation and compression/encoding, an optical acquisition environment of the hologram, and a holographic display system may be evaluated. The analysis display unit 160 may display the analysis result on the display.

The apparatus described above may be implemented as a hardware component, a software component, and/or a combination of the hardware component and the software component. For example, devices and components described in the embodiments may be implemented using, for example, one or more general purpose or special purpose computers, such as a processor, a controller, an arithmetic logic unit (ALU), a digital signal processor, a microcomputer, a field programmable array (FPA), a programmable logic unit (PLU), a microprocessor, or any other device capable of executing and responding to instructions. The processing device may execute operating system (OS) and one or more software applications running on the operating system. The processing device may also access, store, manipulate, process, and generate data in response to execution of the software. For convenience of understanding, although one processing device is sometimes described as being used, one of ordinary skill in the art will recognize that the processing device includes a plurality of processing elements and/or a plurality of types of processing elements. For example, the processing device may include a plurality of processors or one processor and one controller. Other processing configurations are also possible, such as parallel processors.

Software may include a computer program, a code, instructions, or a combination of one or more of these, may configure a processing device to operate as desired, and may independently or collectively command the processing device. The software and/or data may be permanently or temporarily embodied in any kind of machine, a component, a physical device, a virtual equipment, a computer storage medium or device, a transmitted signal wave to be interpreted by or to provide instructions or data to the processing device. The software may be distributed over networked computer systems and may be stored or executed in the distributed manner. The software and data may be stored in one or more computer-readable recording media.

According to an embodiment of the present disclosure, the apparatus for analyzing a depth of a three-dimensional holographic image may measure the depth in a three-dimensional holographic image by using a lensless manner. In the method of using a lens, the sense of depth of the holographic display was evaluated by changing the focus of the lens. Since this typical method uses an optical lens, it is difficult to accurately and quickly check the quality of a holographic display because it is inevitable to configure an additional optical system according to the lens periphery distortion and the distance between the display and the camera. However, when photosensor panel and the transparent photosensor panel having the lensless type as proposed in the present disclosure are applied to the analysis device, the holographic space may be scanned in real time, and the sense of depth may be measured more clearly and easily.

The contents described above are specific embodiments for implementing the present disclosure. The present disclosure will include not only the embodiments described above but also embodiments in which a design is simply or easily capable of being changed. In addition, the present disclosure may also include technologies easily changed to be implemented using embodiments. Therefore, the scope of the present disclosure is not limited to the described embodiments but should be defined by the claims and their equivalents.

What is claimed is:

1. An apparatus which analyses a depth of a holographic image, the apparatus comprising:
    an acquisition device configured to acquire a hologram;
    a restoration device configured to restore a three-dimensional holographic image by irradiating the hologram with a light source;
    an image sensor configured to sense a depth information image of the restored holographic image; and
    a processor configured to execute instructions; and
    a memory storing the instructions, wherein execution of the instructions configures the processor to:
        analyze a depth quality of the holographic image, based on the sensed depth information image,
    wherein the image sensor senses the depth information image through a lensless type of photosensor,
    wherein the image sensor comprises:
    a plurality of transparent plane photosensors configured to measure the holographic image restored by the restoration device; and
    at least one electric rail configured to move the plurality of transparent plane photosensors in a depth direction of the holographic image,
    wherein the plurality of transparent plane photo sensors comprises:
    a first transparent plane photosensor configured to move in a depth direction of a first region of a holographic space in which the restored holographic image is displayed; and
    a second transparent plane photosensor configured to move in a depth direction of a second region of the holographic space.

2. The apparatus of claim 1, wherein the depth direction of the holographic image corresponds to a direction of a spatial light modulator of the restoration device from the photosensor panel.

3. The apparatus of claim 1, wherein the first region and the second region do not overlap each other.

4. The apparatus of claim 1, further comprising:
    an image transmitter configured to sequentially transmit the depth information image sensed by the image sensor in real time; and
    an image generator configured to three-dimensionally restore the transmitted depth information image in a depth axis direction.

5. The apparatus of claim 1, wherein the processor is further configured to:
    compare the depth information image with depth information of an original image associated with an object; and
    analyze a depth reproduction quality based on the comparison result.

6. The apparatus of claim 1, wherein the restoration device includes:
    a laser device configured to generate a laser and provide the generated laser as the light source;
    a collimator configured to output the generated laser as an enlarged plane wave;
    a spatial light modulator configured to reflect light modulated from the plane wave into a space when the enlarged plane wave is incident; and
    a beam splitter configured to change a direction of at least a portion of the light reflected from the spatial light modulator and propagate the changed light.

* * * * *